(12) United States Patent
Vaccaro et al.

(10) Patent No.: US 11,248,722 B2
(45) Date of Patent: Feb. 15, 2022

(54) ADAPTER FOR MOUNTING CABLES AND CABLE HANGERS AND CLAMP MEMBERS FOR MOUNTING SAME

(71) Applicant: CommScope Technologies LLC, Hickory, NC (US)

(72) Inventors: Ronald A. Vaccaro, Taylorsville, NC (US); Christopher Stockman, Joliet, IL (US); Aviral Joshi, Chicago, IL (US); Darin W. Piburn, Keller, TX (US)

(73) Assignee: CommScope Technologies LLC, Hickory, NC (US)

( * ) Notice: Subject to any disclaimer, the term of this patent is extended or adjusted under 35 U.S.C. 154(b) by 162 days.

(21) Appl. No.: 16/413,233

(22) Filed: May 15, 2019

(65) Prior Publication Data

US 2019/0353282 A1 Nov. 21, 2019

Related U.S. Application Data

(60) Provisional application No. 62/673,571, filed on May 18, 2018, provisional application No. 62/684,394, filed on Jun. 13, 2018, provisional application No. 62/718,585, filed on Aug. 14, 2018.

(51) Int. Cl.
*F16L 3/12* (2006.01)
*F16B 2/02* (2006.01)
*F16B 2/24* (2006.01)
*F16L 3/22* (2006.01)
*F16L 3/10* (2006.01)

(52) U.S. Cl.
CPC .................... *F16L 3/12* (2013.01); *F16B 2/02* (2013.01); *F16B 2/24* (2013.01); *F16L 3/1016* (2013.01); *F16L 3/22* (2013.01)

(58) Field of Classification Search
CPC ... F16L 3/12; F16L 3/1016; F16L 3/22; F16B 2/02; F16B 2/24; F16B 21/088; H02G 3/26
USPC ..... 248/49, 55, 58, 60, 62, 63, 65, 68.1, 69, 248/70, 72, 74.1, 74.3, 74.5; 446/128
See application file for complete search history.

(56) References Cited

U.S. PATENT DOCUMENTS

| 3,444,596 | A | * | 5/1969 | Soltysik | F16L 3/13 248/73 |
|---|---|---|---|---|---|
| 5,044,584 | A | | 9/1991 | Lin | |
| 5,947,426 | A | * | 9/1999 | Kraus | B60R 16/0215 248/68.1 |

(Continued)

FOREIGN PATENT DOCUMENTS

CN 203362784 U 12/2013

OTHER PUBLICATIONS

"International Preliminary Report on Patentability corresponding to International Application No. PCT/US2019/030589 dated Dec. 3, 2020".

(Continued)

*Primary Examiner* — Christopher Garft
*Assistant Examiner* — Michael McDuffie
(74) *Attorney, Agent, or Firm* — Myers Bigel, P.A.

(57) ABSTRACT

An adapter for mounting a cable hanger on a mounting structure includes a body having a base and a neck, the base having a hollow cavity and including a mounting hole with an overhanging rim, the neck including a threaded bore, the adapter being formed of a polymeric material.

13 Claims, 13 Drawing Sheets

(56) References Cited

U.S. PATENT DOCUMENTS

| | | | | |
|---|---|---|---|---|
| 6,070,836 A * | 6/2000 | Battie | ...................... | F16L 3/223 |
| | | | | 248/68.1 |
| 6,206,330 B1 * | 3/2001 | Oi | ....................... | F16B 37/0842 |
| | | | | 248/635 |
| 6,308,921 B1 * | 10/2001 | Borzucki | ................ | F16L 3/237 |
| | | | | 248/68.1 |
| 7,097,142 B1 * | 8/2006 | Schmidt | .................... | F16L 3/12 |
| | | | | 248/68.1 |
| 7,387,281 B2 * | 6/2008 | Nakamura | ........... | G02B 6/3616 |
| | | | | 248/49 |
| 8,011,621 B2 * | 9/2011 | Korczak | ................ | F16L 3/127 |
| | | | | 248/68.1 |
| 8,191,836 B2 | 6/2012 | Korczak | | |
| 8,439,316 B2 * | 5/2013 | Feige | ........................ | F16L 3/10 |
| | | | | 248/71 |
| 8,914,952 B2 * | 12/2014 | Wakabayashi | ...... | F16B 37/0842 |
| | | | | 24/457 |
| 9,334,894 B2 * | 5/2016 | Gensler | ............... | F16B 37/0842 |
| 9,812,762 B2 | 11/2017 | Skrepcinski et al. | | |
| 9,866,004 B2 | 1/2018 | Vaccaro et al. | | |
| 9,903,510 B2 | 2/2018 | Aviral et al. | | |
| 10,851,916 B2 * | 12/2020 | Vaccaro | ................. | H02G 3/263 |
| 2002/0005463 A1 * | 1/2002 | Paske | ....................... | H02G 3/30 |
| | | | | 248/74.1 |
| 2003/0089828 A1 * | 5/2003 | Korczak | ................. | F16B 37/02 |
| | | | | 248/68.1 |
| 2006/0226300 A1 | 10/2006 | Shibuya | | |
| 2009/0230256 A1 * | 9/2009 | Widlacki | ................ | F16L 3/222 |
| | | | | 248/68.1 |
| 2009/0294602 A1 | 12/2009 | Korczak | | |
| 2010/0000763 A1 | 1/2010 | Stansberry, Jr. | | |
| 2014/0175233 A1 * | 6/2014 | Han | ......................... | H02G 3/32 |
| | | | | 248/74.1 |
| 2014/0374544 A1 * | 12/2014 | Pearson | .................... | F16L 3/12 |
| | | | | 248/68.1 |
| 2015/0366100 A1 * | 12/2015 | Larsen | ................. | H05K 7/1491 |
| | | | | 248/69 |
| 2018/0045336 A1 | 2/2018 | Vaccaro | | |

OTHER PUBLICATIONS

International Search Report and Written Opinion corresponding to International Application No. PCT/US2019/030589 dated Aug. 16, 2019

"Office Action corresponding to Chinese Application No. 201980032590.7 dated Sep. 3, 2021".

* cited by examiner

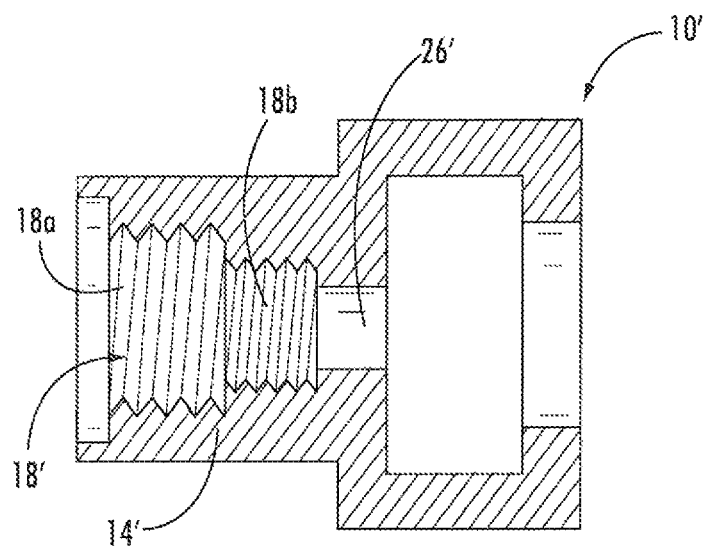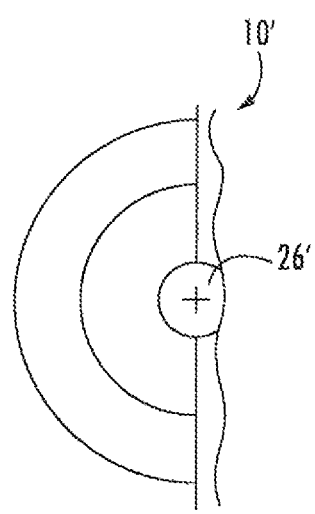
FIG. 5  FIG. 6
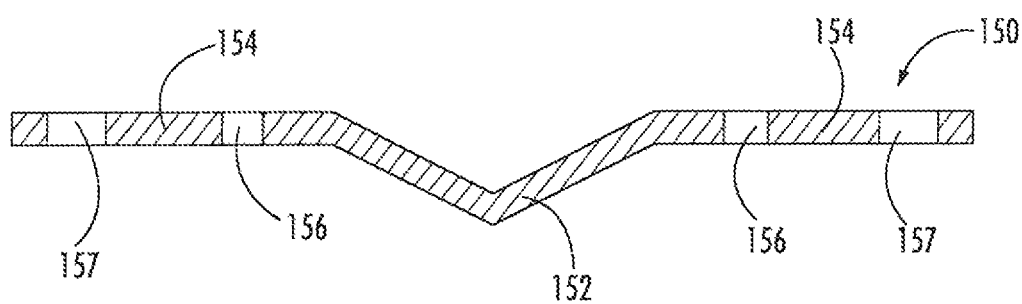
FIG. 7
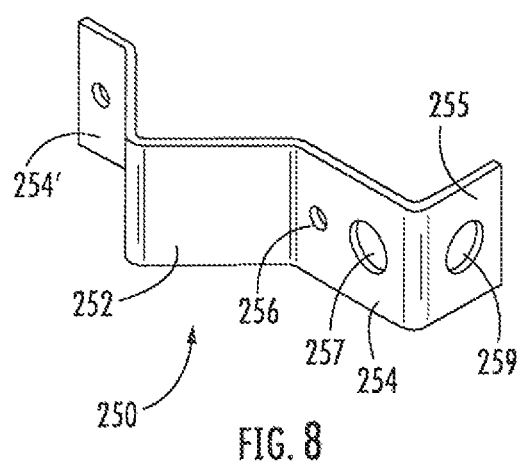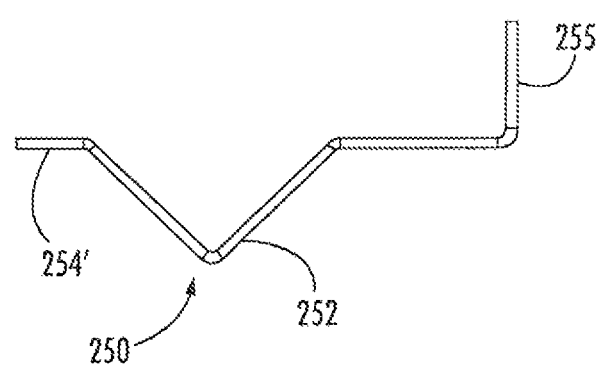
FIG. 8  FIG. 9

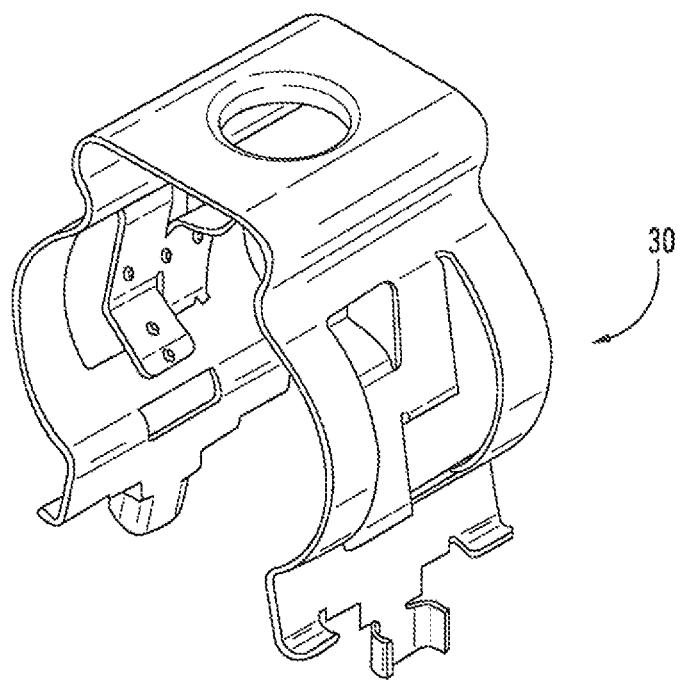
FIG. 10
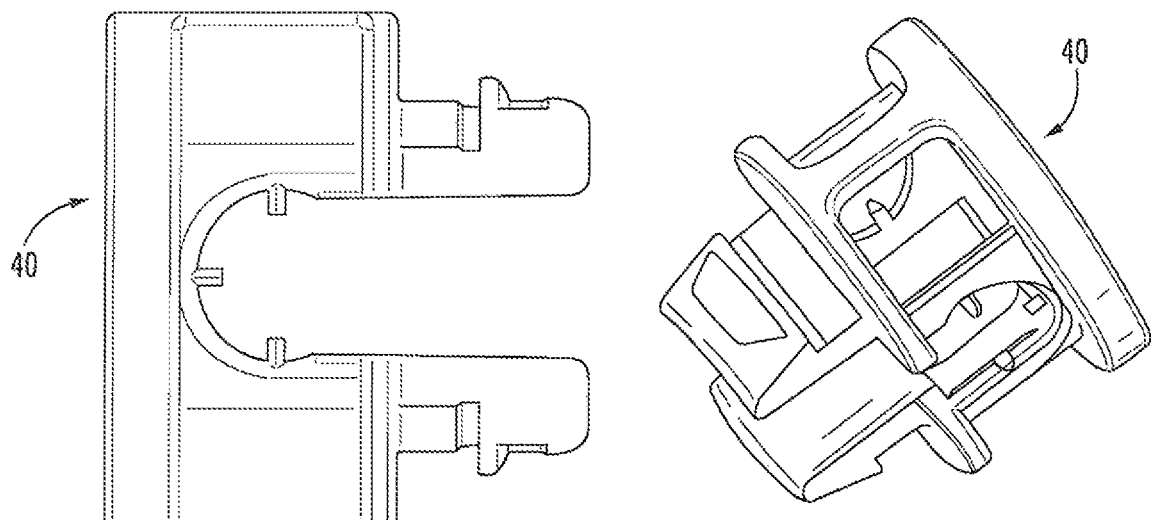
FIG. 11
FIG. 12

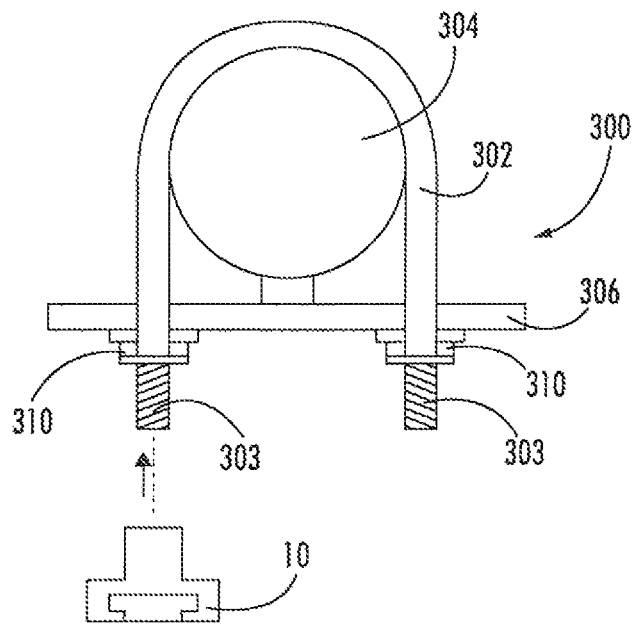
FIG. 13
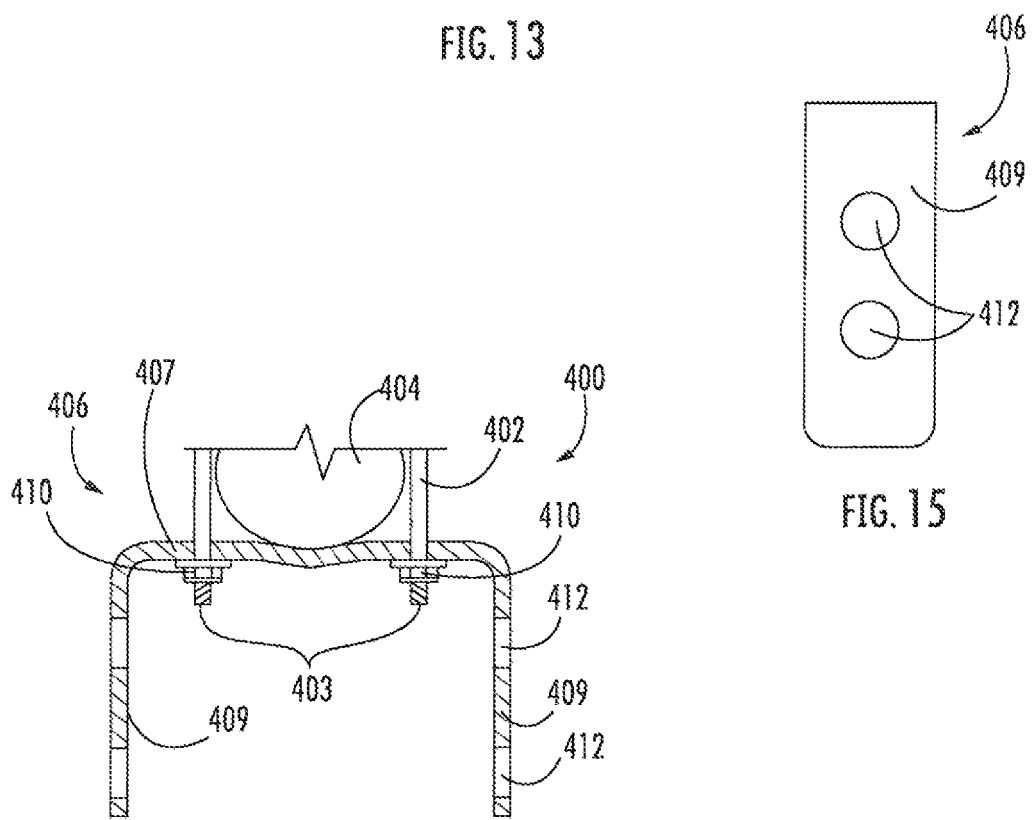
FIG. 14
FIG. 15

ADAPTER FOR MOUNTING CABLES AND CABLE HANGERS AND CLAMP MEMBERS FOR MOUNTING SAME

RELATED APPLICATIONS

This application claims priority from and the benefit of U.S. Provisional Patent Application Nos. 62/673,571, filed May 18, 2018; 62/684,394, filed Jun. 13, 2018; and 62/718,585, filed Aug. 14, 2018, the disclosures of which are hereby incorporated herein by reference in full.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). Other cable hangers are shown in U.S. Pat. No. 9,866,004 to Vaccaro and U.S. Pat. No. 9,903,510 to Vaccaro and U.S. Patent Publication No. 2018/0045336 to Vaccaro, the disclosures of each of which are hereby incorporated herein by reference in full.

Areas near cellular antennas (i.e., within 1λ, or one wavelength) can be (relatively) high radio frequency (RF) energy environments. Conductive items in these areas, such as hangers and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions for hanging cables with reduced (or eliminated) likelihood of PIM generation.

SUMMARY

As a first aspect, embodiments of the invention are directed to an adapter for mounting a cable hanger on a mounting structure. The adapter comprises: a body having a base and a neck, the base having a hollow cavity and including a mounting hole with an overhanging rim, the neck including a threaded bore, the adapter being formed of a polymeric material.

As a second aspect, embodiments of the invention are directed to a half clamp member comprising: a bent central section; and two end sections attached to opposite ends of the central section. Each of the end sections includes a first hole for receiving a threaded rod. At least one of the end sections includes a second mounting hole that is larger in diameter than the first hole.

As a third aspect, embodiments of the invention are directed to an assembly comprising: a U-bolt with threaded ends; a mounting component with holes that receive the threaded ends of the U-bolt; a member surrounded by the U-bolt and the mounting component, the U-bolt and mounting component secured to the member via nuts threaded onto the threaded ends; and an adapter as described above attached to one of the threaded ends, with the threaded bore of the adapter being receiving the threaded end of the U-bolt.

As a fourth aspect, embodiments of the invention are directed to an adapter for mounting a cable hanger on a mounting structure comprising: a main body with at least one side wall; a floor, the main body extending from the floor; a lip extending radially inwardly from a free end of the side wall; a pair of latches extending from the floor in a direction opposite the body; and a ring extending from the floor within the main body.

BRIEF DESCRIPTION OF THE FIGURES

FIG. 5 is a section view of an adapter for a cable hanger according to alternative embodiments of the invention.

FIG. 6 is a partial end view of the adapter of FIG. 5.

FIG. 7 is a side section view of a half clamp according to alternative embodiments of the invention.

FIG. 8 is a perspective view of a half clamp according to further embodiments of the invention.

FIG. 9 is a side view of the half clamp of FIG. 8.

FIG. 10 is a perspective view of a steel cable hanger that may be employed with the adapters of FIGS. 1, 5 and 6.

FIG. 11 is a side view of a polymeric cable hanger that may be employed with the half clamps of FIGS. 7-9.

FIG. 12 is a perspective view of the cable hanger of FIG. 11.

FIG. 13 is a top view of a U-bolt attached to a member of an antenna mount with an adapter shown in FIG. 1 exploded from an end of the U-bolt.

FIG. 14 is a top view of a U-bolt and antenna mount member as in FIG. 13 with a mounting channel that provides mounting locations.

FIG. 15 is a side view of the mounting channel of FIG. 14.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
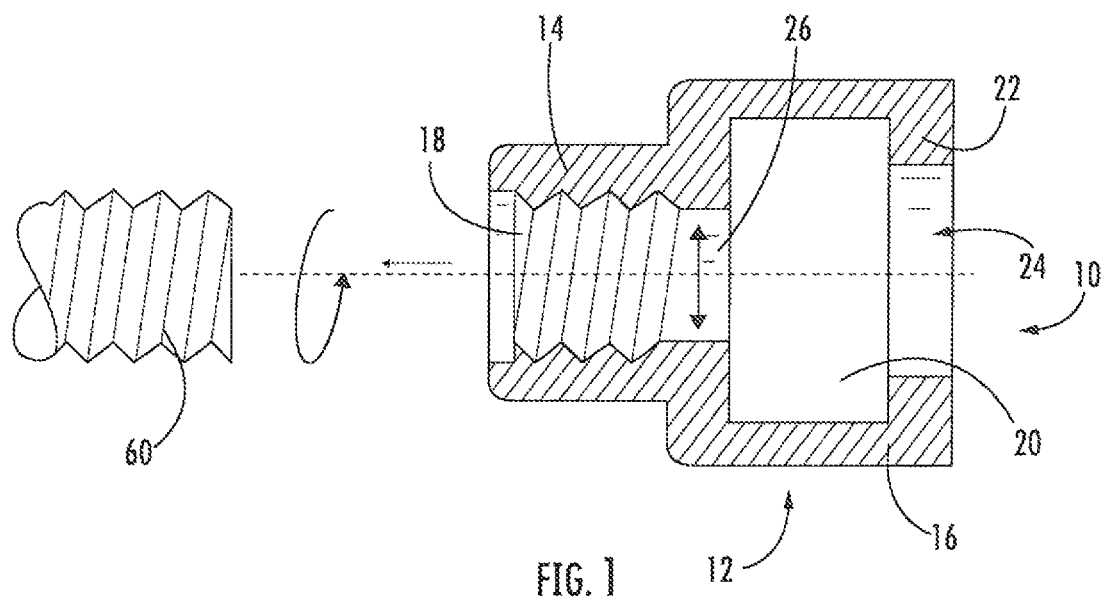
FIG. 1 is a side section view of an adapter for a cable hanger, shown exploded from a threaded rod of a clamp, according to embodiments of the invention.

Referring now to the drawings, an adapter for facilitating the hanging of cable hangers, designated broadly at 10, is shown in FIG. 1. The adapter 10 includes a generally cylindrical body 12 having a narrower neck 14 and a wider base 16. The neck 14 includes a threaded bore 18. The base 16 is hollow, with a cavity 20, and has an overhanging rim 22 that encircles a mounting hole 24 (typically a nominally ¾ inch hole). As can be seen in FIG. 1, the mounting hole 24 and bore 18 are collinear, although in some embodiments this may not be the case. A passage 26 that is smaller in diameter than the bore 18 connects the bore 18 with the cavity 20.

The adapter 10 is typically formed of a polymeric material, such as acetal resin or Nylon 6,6, and may be injection-molded. Alternatively, it may be machined or turned on a lathe.

Figure 2:
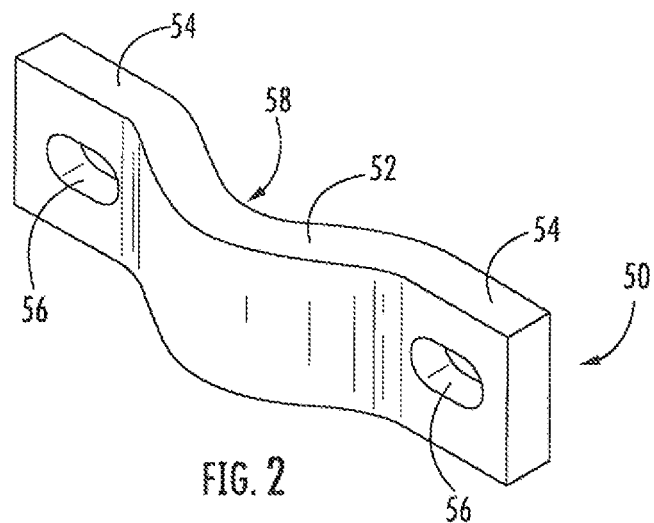
FIG. 2 is a perspective view of a conventional half clamp.
Figure 3:
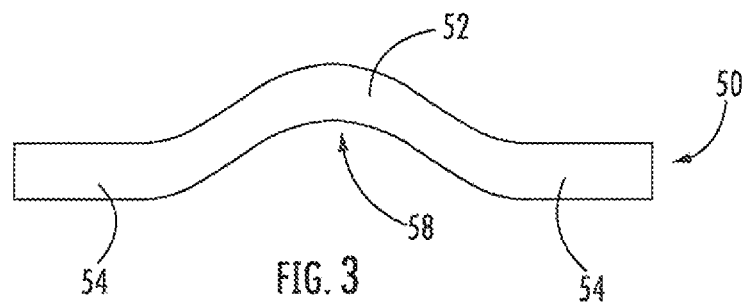
FIG. 3 is a side view of the half clamp of FIG. 2.
Figure 4:
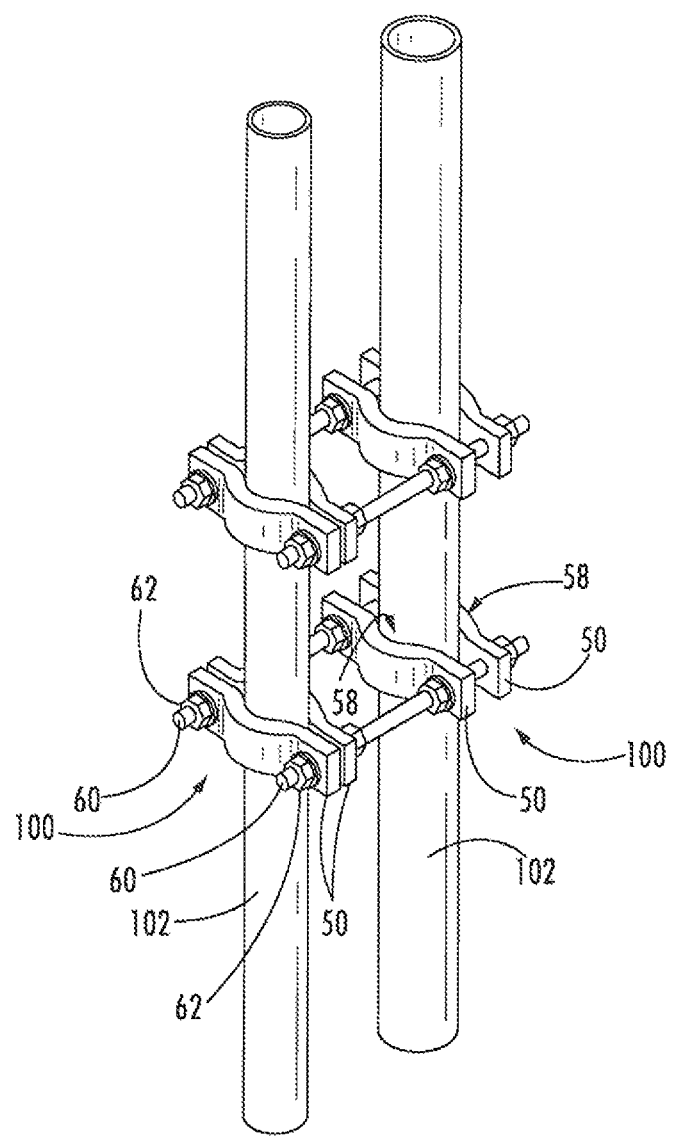
FIG. 4 is a perspective view of four clamps that employ half clamps of FIG. 2, the half clamps of each clamp being held together with threaded rods such as those shown in FIG. 1.

FIGS. 2 and 3 illustrates a typical "half clamp" 50, which is one component of a typical clamp 100 (illustrated in FIG. 4). The half-clamp 50 is a unitary member with a bent central section 52 sandwiched by two flat end sections 54. A hole 56 is present in each end section 54. A pocket 58 is formed by the bent section 52.

As can be seen in FIG. 4, two opposed half-clamps 50 can be employed in the clamp 100 to attach pipes 102, which are typically used in the mounting of antennas and/or radios (see, for example, U.S. Pat. No. 9,812,762 to Skrepcinski et al, the disclosure of which is hereby incorporated herein by reference. As shown in FIG. 4, the half clamps 50 are oriented so that the pipe 102 is captured in their pockets 58. Threaded rods 60 are inserted through the holes 56 in the half-clamps 50 and secured with nuts 62.

As shown in exploded view in FIG. 1, the adapter 10 shown therein can be attached to the threaded end of a threaded rod 60 of a clamp 100. Specifically, the bore 18 of the adapter 10 threadedly receives the end of the threaded rod 60. Once attached, the adapter 10 can be used for mounting a conventional steel cable hanger, such as that discussed above and shown in FIG. 10 at 30, in the mounting hole 24; in turn, the cable hanger 30 can be used to mount cables for an antenna or radio mounted to or near the pipes 102. Because the adapter 10 is formed of a non-metallic material, there is no metal-on-metal joint between the half clamp 50 or threaded rod 60 and the cable hanger 30 that could otherwise cause undesirable PIM that may deleteriously affect the antennas or radios.

Those skilled in this art will appreciate that adapter 10 may be used with other components that include a threaded end. As one example, in some instances a U-bolt may be employed to attach two pipes (and often is in antenna mounts). The ends of the U-bolt may be threaded to receive nuts; these threaded ends may then be used to mount the adapter 10. Threaded ends of other structures may also be used.

Referring now to FIGS. 5 and 6, another adapter, designated at 10', is shown therein. The adapter 10' is similar to the adapter 10, but the bore 18' in the neck 14' has two different threaded sections: a wider section 18a nearer the end of the neck 14', and a narrower section 18b adjacent the passage 26'. This configuration enables a single adapter 10' to be used with components having threaded ends of two different sizes (e.g., ½ inch and ⅜ inch). Once mounted on the threaded end, the adapter 10' can be used as a PIM-reducing mounting location for cable hangers as discussed above.

Those of skill in this art will appreciate that the adapters 10, 10' may take different forms. For example, in some embodiments the passage 26 may be omitted. In other embodiments, the mounting hole 24 may not be collinear with the bore 18, or even parallel to the bore 18; for example, the mounting hole 24 may be perpendicular to the bore 18 if it were preferable to mount a cable to the side of a threaded rod 60 rather than "in-line" with it.

Referring now to FIG. 7, another embodiment of a half clamp, designated broadly at 150, is shown therein. The half clamp 150 is similar to the half clamp 50 in that it includes a bent central section 152 and two flat end sections 154. However, as can be seen in FIG. 7, the end sections 154 are longer than the end sections 54 of the half clamp 50. Also, each end section 154 includes a hole 156 similar to the holes 56 discussed above that receive a threaded rod, but also include a larger hole 157 (typically ¾ inch) that can receive a cable hanger (particularly one formed of a polymeric material, such as those discussed in U.S. Patent Publication No. 2018/0045336 to Vaccaro, supra, and shown in FIGS. 11 and 12 at 40. As a result, each end section 154 can support both a cable hanger (which can either be a steel hanger 30 as in FIG. 10 or a polymeric hanger 40 as in FIGS. 11 and 12) via an adapter 10, 10' mounted on a threaded rod inserted through the hole 156 and another cable hanger (typically a polymeric hanger as in FIGS. 11 and 12 to avoid potential PIM) mounted in the hole 157.

Referring now to FIGS. 8 and 9, a half clamp 250 shown therein has a central bent section 252, an end section 254 similar to the end section 54, and an end section 254' that is similar to the end section 154, with holes 256, 257, but with an added perpendicular flange 255 that includes another hole 259 similar in size to the hole 258. Thus, the half clamp 250 can support two adapters 10, 10' mounted to threaded rods inserted through the holes 256, and can also support two perpendicularly mounted cable hangers inserted into the holes 257, 259.

Referring now to FIG. 13, another assembly according to embodiments of the invention is shown therein and designated broadly at 300. The assembly 300 includes a U-bolt 302 mounted to a member 304 (such as a vertical mounting pole of an antenna tower). The U-bolt 302 is maintained in place with a mounting plate 306; the threaded ends 303 of the U-bolt 302 are inserted through holes in the mounting plate 306 and secured with nuts 310. The threaded ends 303 of the U-bolt 302 provide potential mounting locations for an adapter 10 or 10' as discussed above. The adapter 10, 10' can then serve as a mounting point for cable hangers such as those shown in FIGS. 10-12.

Referring now to FIGS. 14 and 15, another assembly is shown therein and designated broadly at 400. Like the assembly 300, the assembly 400 includes a U-bolt 402 mounted to a member 404. In the assembly 400, a mounting channel 406 with a main panel 407 and flanges 409 is employed to mount the U-bolt 402. The threaded ends 403 of the U-bolt 402 are inserted through holes in the main panel 407 and secured with nuts 410. As can be seen in FIG. 15, each of the flanges 409 includes holes 412 that are sized to receive a cable hanger such as those shown in FIGS. 10-12, and may be particularly well-suited to receive a cable hanger formed of a polymeric material to eliminate PIM.

Figure 16:
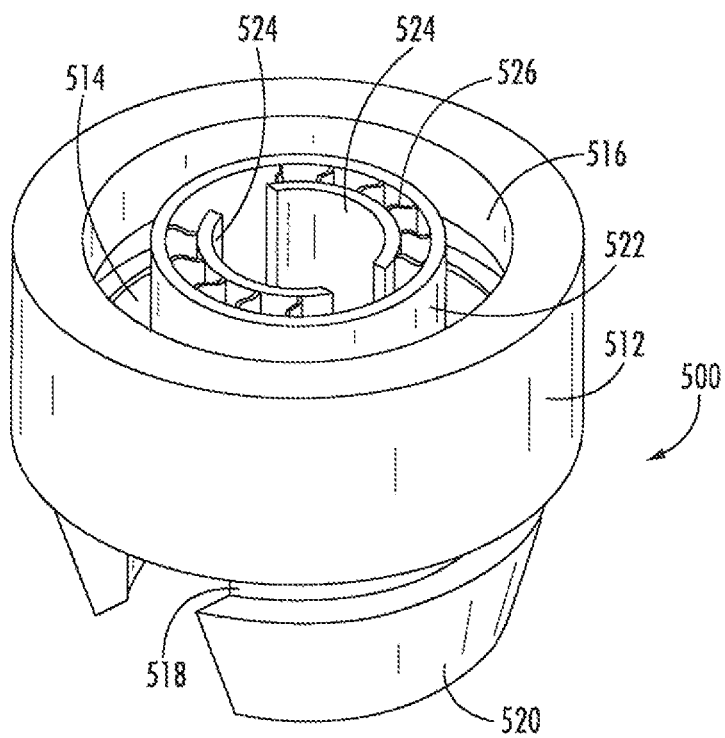
FIG. 16 is a perspective view of an adapter for hanging cables according to alternative embodiments of the invention.
Figure 17:
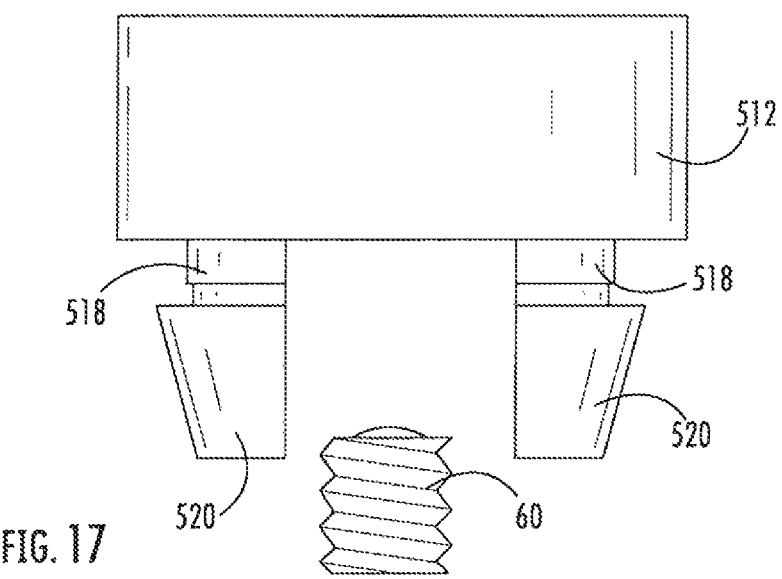
FIG. 17 is a side view of the adapter of FIG. 16.
Figure 18:
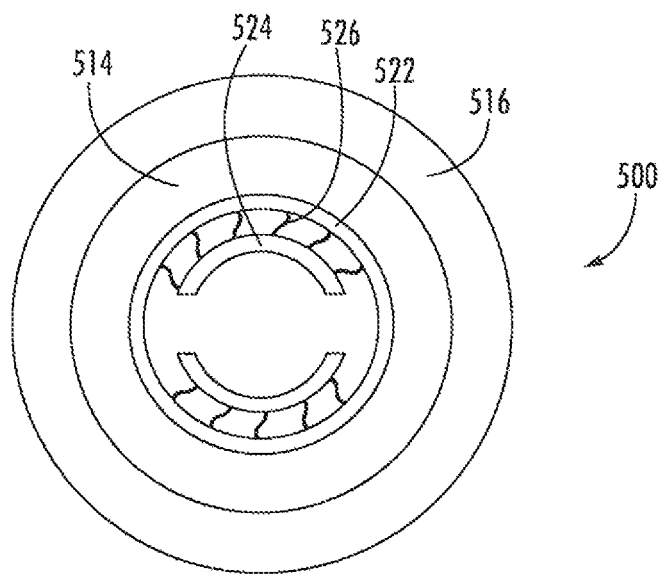
FIG. 18 is a top view of the adapter of FIG. 16.
Figure 19:
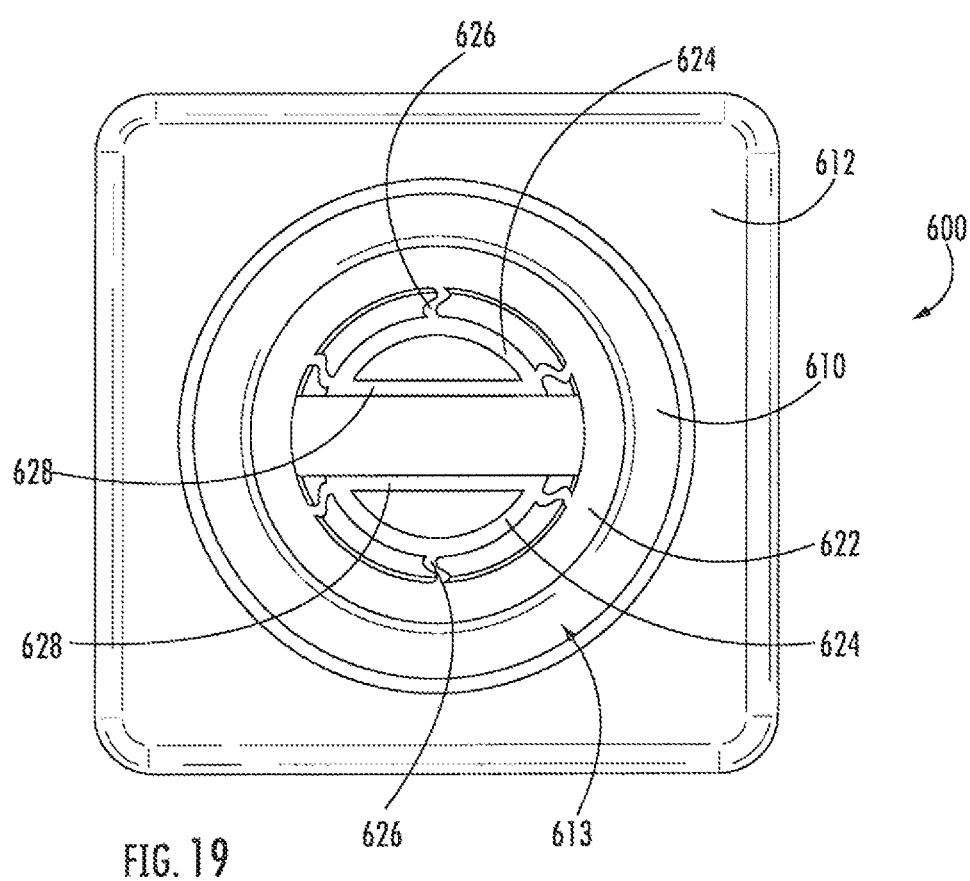
FIG. 19 is a top view of an adapter for hanging cables according to further embodiments of the invention.
Figure 20:
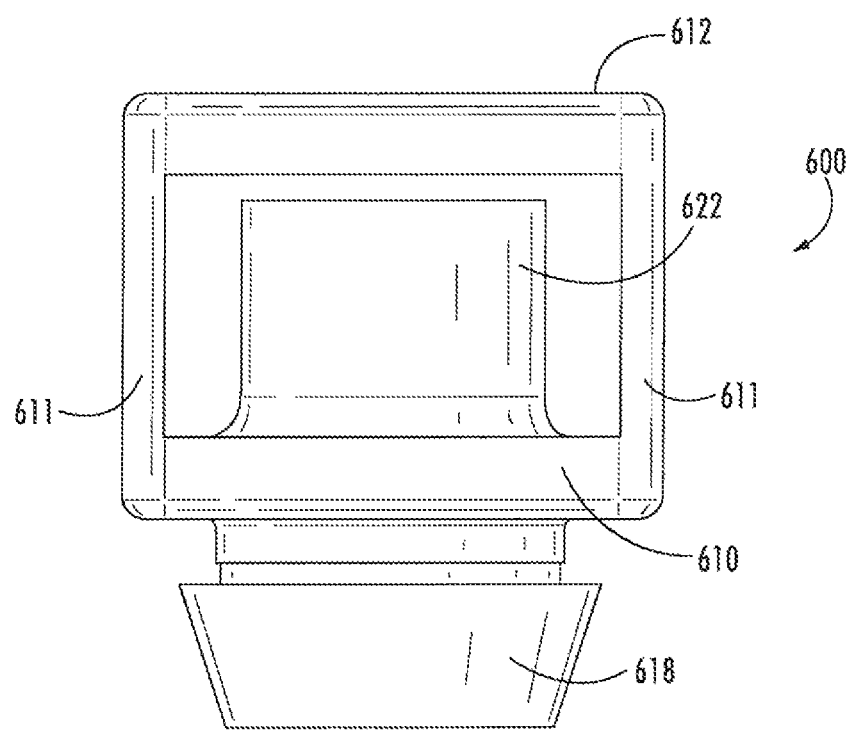
FIG. 20 is a side view of the adapter of FIG. 19.

Referring now to FIGS. 16-18, another embodiment of an adapter, designated broadly at 500, is illustrated therein. The adapter 500 is intended to address a potential issue that can arise with certain cable hangers, such as the cable hanger 40 shown in FIGS. 11 and 12. More specifically, in some instances the design of the cable hanger 40 allows for about +/−30 degrees misalignment of crossing cables. Thus, with each subsequently stacked hanger 40, an additional 30 degrees of rotation may be permitted. However, there are instances in field use in which where the first and second cables in a stack need to cross at 90 degrees. This can cause great difficulties for the user, and in some instances a user may try to overpower the tines and barbs of the cable hanger 40 to force a connection, thereby breaking the cable hanger 40.

This aforementioned issue can be addressed with the adapter 500. The adapter 500 includes a generally cylindrical main body 512 that extends from an annular floor 514. A lip 516 extends radially inwardly from the free end of the main body 512. Two latches 518 with hooks 520 extend from the floor 514 opposite the body 512. Also, a ring 522 extends from the floor 514 within the main body 512. Two inner arced segments 524 are located within the ring 522 and are mounted thereto via a plurality of thin S-springs 526. The arced segments 524 have threads (not shown) on their radially inward surfaces. In some embodiments, the arced segments 524 define a nominal ⅜ inch diameter.

The adapter 500 can be employed to provide a mounting location for a cable hanger (such as a cable hanger 40 described above) by threading the adapter 500 onto a threaded rod (such as the threaded rod 60 described above—see FIG. 17) inserted between the latches 518 and into the space between the arced segments 524. If the threaded rod is a ⅜ inch rod, it can be threaded onto the arced segments 524 as they remain extended from the inner ring 522 by the S-springs 526. If the threaded rod is a ½ inch rod, it can be threaded onto the arced segments 524, which will be forced radially outward (supported by the S-springs 526) to positions of approximately ½ inch apart. Once threaded onto the rod, the adapter 500 can provide a mounting location for a cable hanger, as the hooks of the cable hanger can be inserted between the inner ring 522 and the main body 512 and be captured by the lip 516.

Additionally, the adapter 500 can also be mounted similarly to a cable hanger in a ¾ inch mounting hole via the latches 518. Once mounted thereon, the adapter 500 can serve as a mounting location for another cable hanger.

Notably, in either mounting configuration, the adapter 500 can provide a mounting location for a cable hanger in which the cable hanger can be mounted in any orientation. As such, the adapter 500 can provide a solution to the issue mentioned above for the cable hangers 40 illustrated in FIGS. 11 and 12.

Referring now to FIGS. 19-22, another adapter, designated broadly at 600, is shown therein. The adapter 600 is similar to the adapter 500 in that it can provide a mounting location for a cable hanger after being mounted either to a threaded rod, a hole in a mounting structure (such as an antenna tower or the like), or another cable hanger. However, the structure of the adapter 600 differs somewhat. The adapter 600 has a floor 610 that is generally square. Two side walls 611 extend from the floor 610 to a generally square ceiling 612 that has a central hole 613. Latches 618 extend from the floor 610 in a direction away from the side walls 611. An inner ring 622 extends from the floor 610 and is generally coaxial with the hole 613. An arced segment 624 is connected with each inner ring 622 via a plurality of S-springs 626. In addition, an inner wall 628 connects the ends of each of the arced segments 624.

Figure 21:
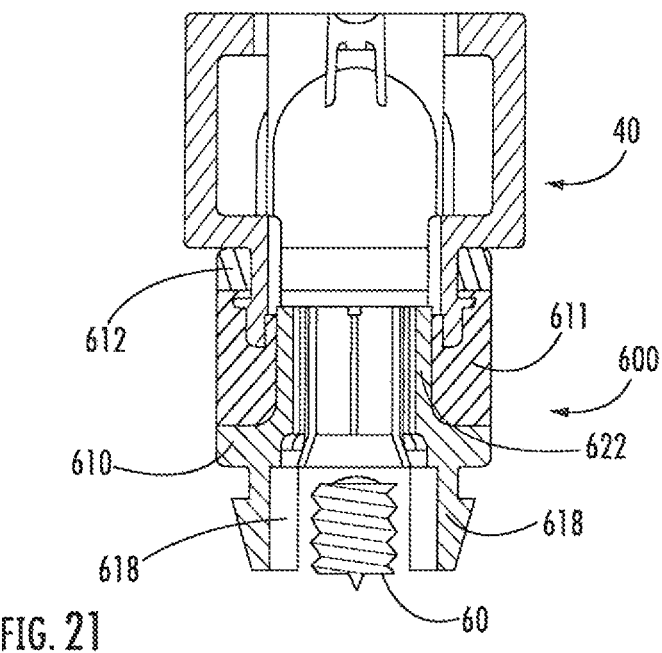
FIG. 21 is a front section view of the adapter of FIG. 19 with a cable hanger of FIG. 11 mounted therein.
Figure 22:
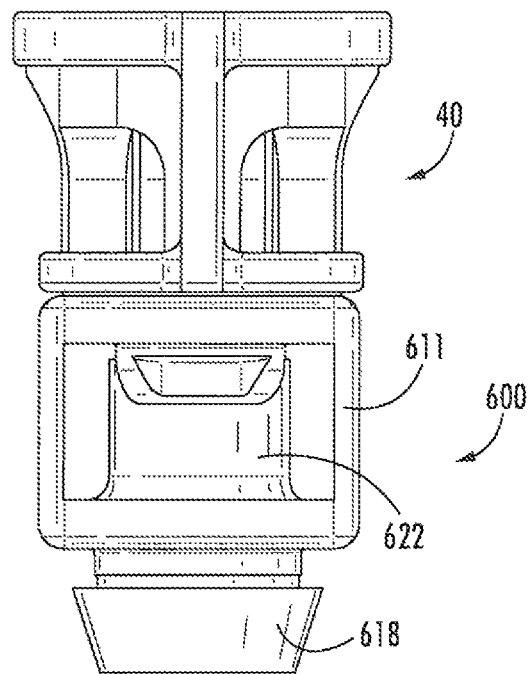
FIG. 22 is a side view of the adapter and cable hanger of FIG. 21.

The adapter 600 can be employed in much the same manner as the adapter 500. However, if the adapter 600 is mounted on a ⅜ inch threaded rod 60, the rod 60 threads against the inner walls 628, which deflect radially outwardly somewhat during threading. This action should provide additional compressive pressure on the threads of the rod 60 to prevent undesirable loosening/unscrewing of the adapter 600 on the rod 60. Even greater compression (and thread grip) is present if the rod is a ½ inch rod. As shown in FIGS. 21 and 22, the adapter 600 can receive the latches of a cable hanger 40 in the hole 613 in the ceiling 612, with the shape of the hole 613 enabling the cable hanger 40 to be mounted in any desired orientation.

Figure 23:
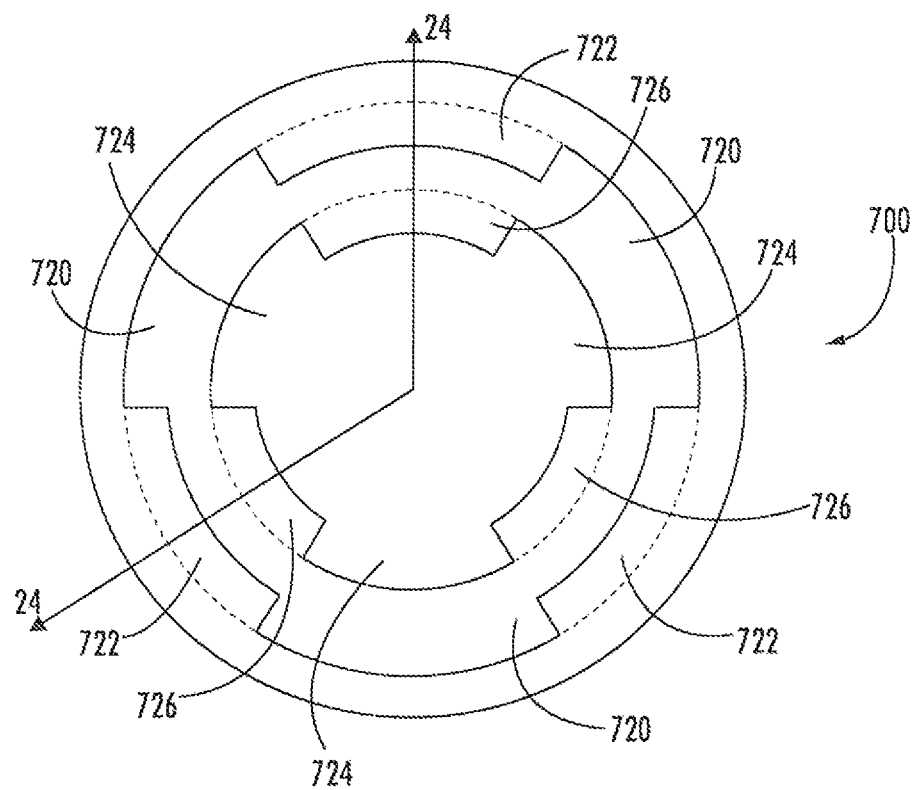
FIG. 23 is a partial end view of an adapter according to further embodiments of the invention.
Figure 24:
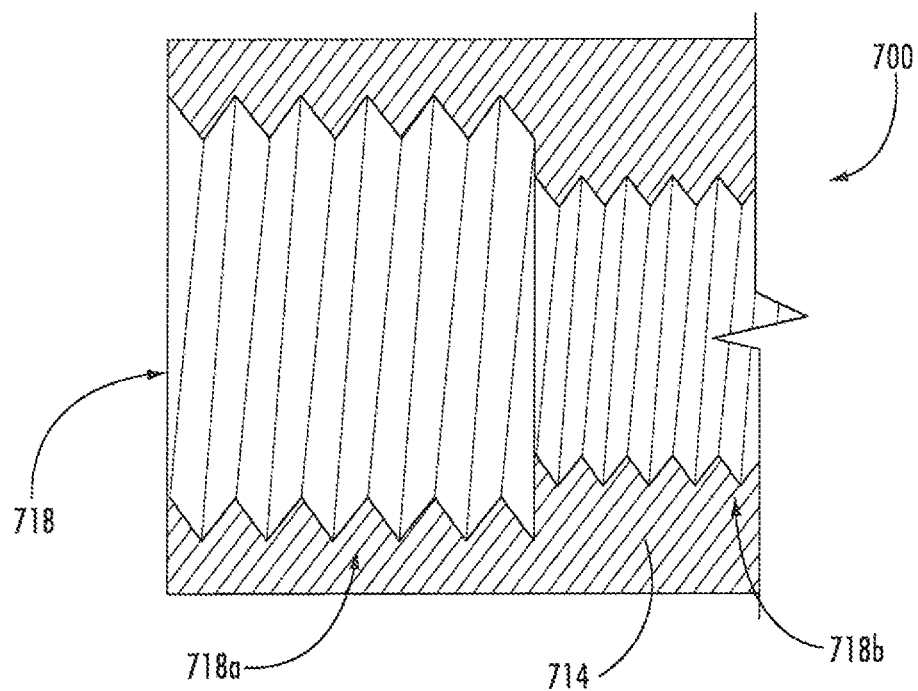
FIG. 24 is a partial section view of the adapter of FIG. 23 taken along lines 24-24 of FIG. 23.

Referring now to FIGS. 23 and 24, another adapter, designated broadly at 700, is shown therein. The adapter 700 is similar to the adapter 10' discussed above, having a bore 718 in the neck 714 with two different threaded sections: a wider section 718a and a narrower section 718b. (It is understood that the adapter 700 includes a base with a mounting hole and rim as described above, but these structures are omitted in FIGS. 23 and 24 for clarity). As best seen in FIG. 23, the threaded section 718a is discontinuous and includes three gaps 720 spaced generally circumferentially equidistant from each other, thereby defining three threaded arcs 722. Similarly, the threaded section 718b is discontinuous and includes three gaps 724 spaced generally circumferentially equidistant from each other to define three threaded arcs 726. This configuration can facilitate injection molding of the threaded sections 718a, 718b.

Figure 25:
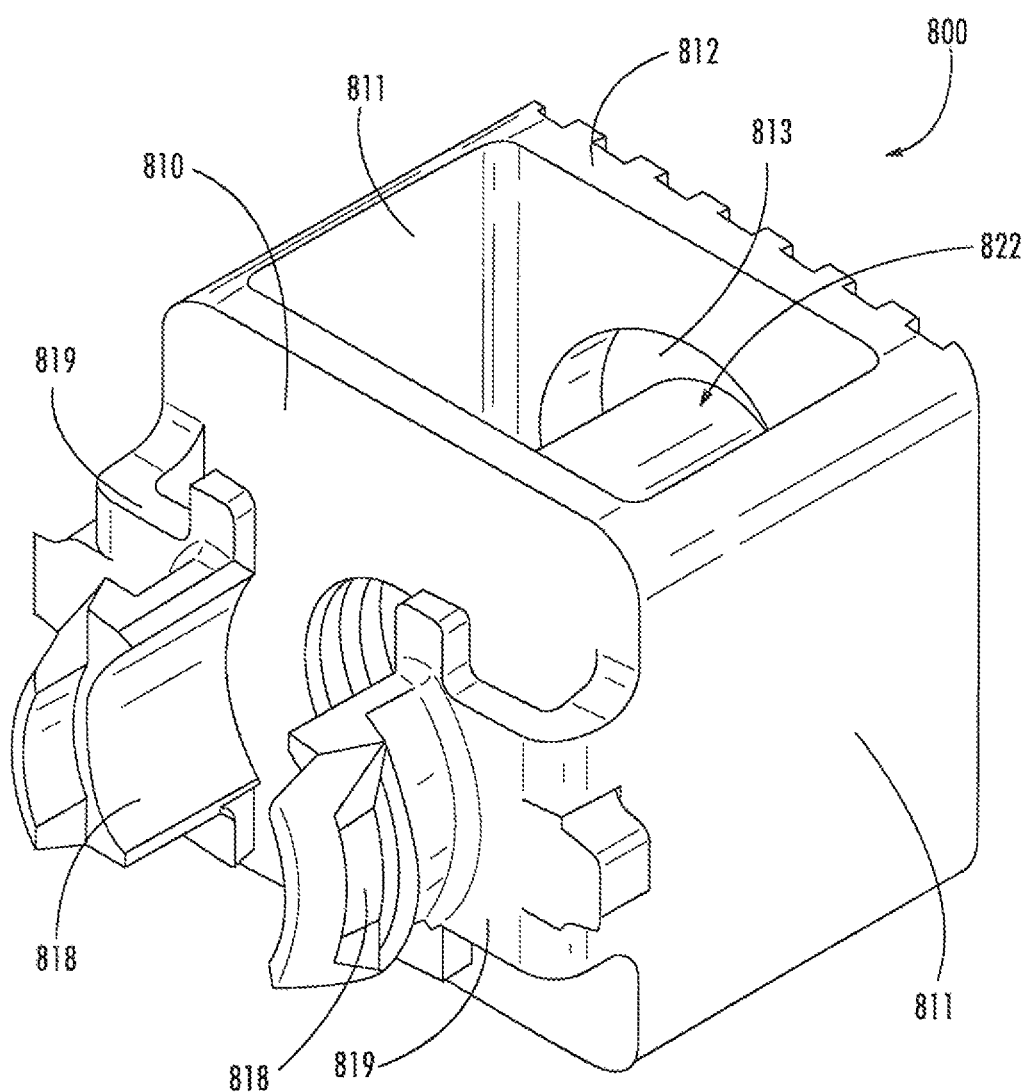
FIG. 25 is a perspective view of an adapter according to yet further embodiments of the invention.
Figure 26:
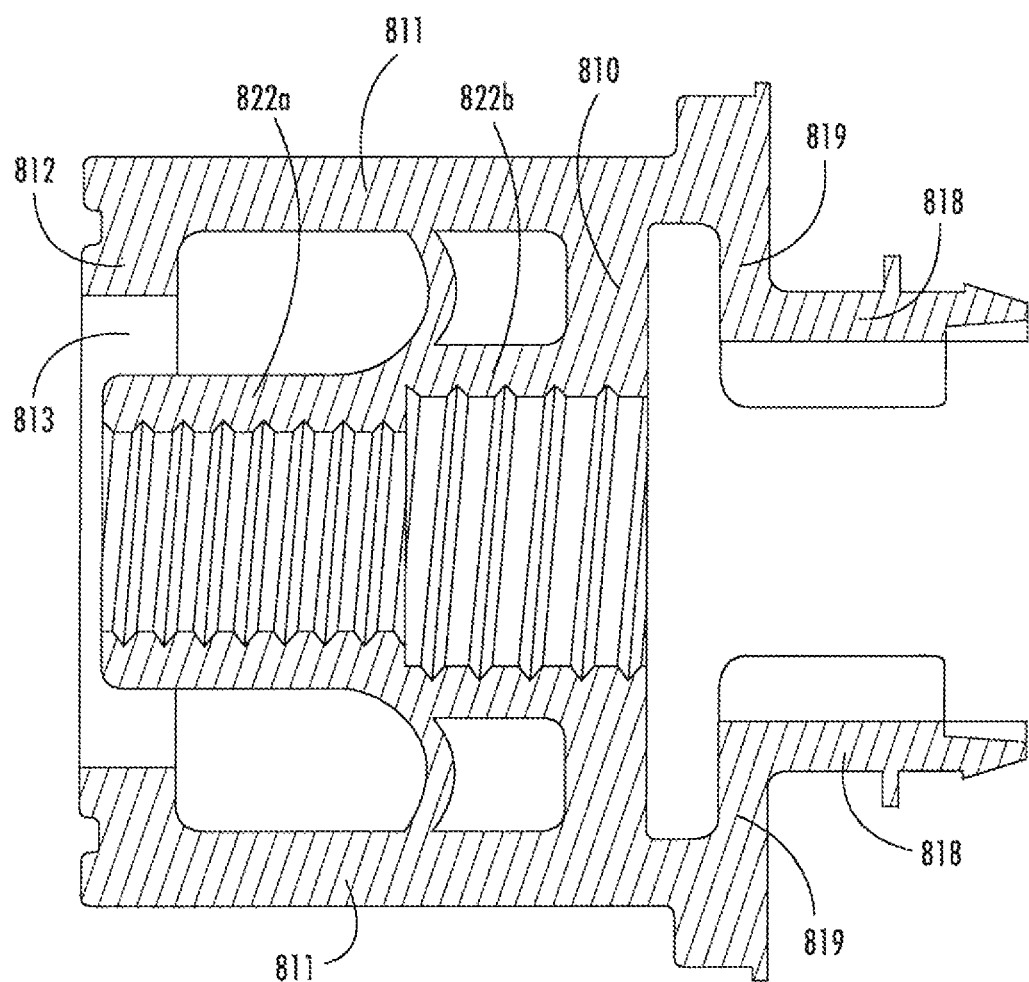
FIG. 26 is a section view of the adapter of FIG. 25.

Referring now to FIGS. 25 and 26, another embodiment of an adapter, designated broadly at 800, is shown therein. The adapter 800 is similar to the adapter 600, with a floor 810 that is generally square, two side walls 811, a generally square ceiling 812 with a central hole 813 that provides a lip as with the adapters 500, 600, latches 818 that extend in a direction away from the side walls 811, and an inner ring 822 extending from the floor 810. However, the inner ring 822 has a narrower section 822a (to receive a ⅜ inch threaded rod in its narrower ID) and a wider section 822b (to receive a ½ inch threaded rod in its wider ID). (Alternatively, the inner ring 822 may have arc segments that can permit attachment to a threaded rod like those of adapters 500 and/or 600). Further, in the adapter 800 the latches 818 are mounted on cantilevered subfloor panels 819 that are mounted to the side walls 811 below the floor 810. Thus, like the adapter 600, the adapter 800 can be mounted on either of a ⅜ inch or ¼ inch threaded rod, or can be mounted to a cable hanger, and in either instance can provide a mounting location for a second cable hanger at any desired orientation.

Figure 27:
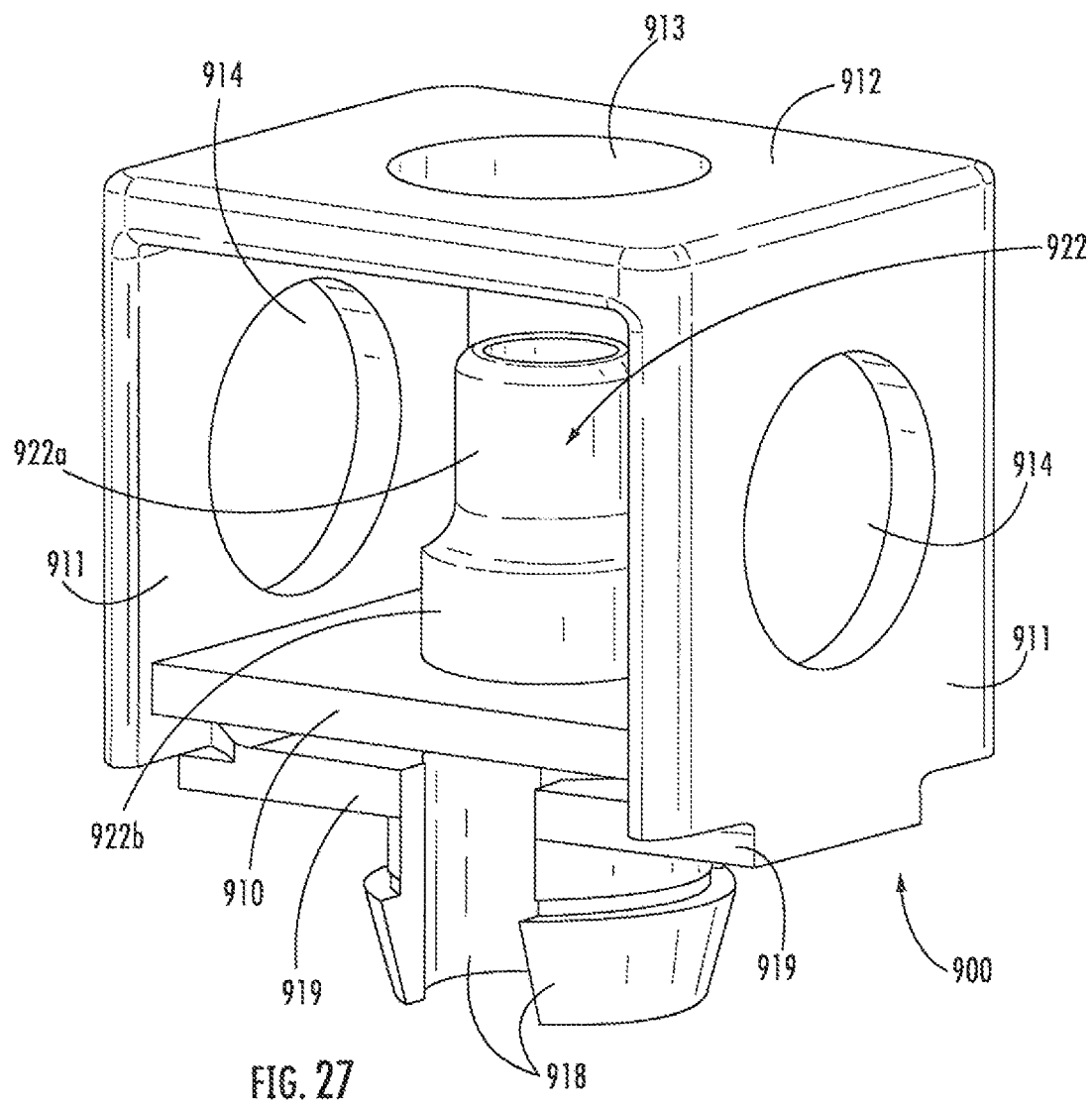
FIG. 27 is a perspective view of an adapter according to yet further embodiments of the invention.

Referring now to FIG. 27, another embodiment of an adapter, designated broadly at 900, is shown therein. The adapter 900 is similar to the adapter 800, with a floor 910 that is generally square, two side walls 911, a generally square ceiling 912 with a central hole 913, latches 918 that are mounted on subfloor panels 919, and an inner ring 922 extending from the floor 910 with a narrower section 922a and a wider section 922b. However, in this embodiment the floor 910 is wider, so that the side walls 911 are spaced farther apart, and each of the side walls 911 includes a mounting hole 914 that can receive a cable hanger in the manner of the hole 913. As a result, the adapter 900 can provide three different mounting locations (in three different directions) for cable hangers 40.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for mounting a cable hanger on a mounting structure, comprising:
   a main body with at least one side wall;
   a floor, the main body extending from the floor;
   a lip extending radially inwardly from a free end of the side wall;
   a pair of latches extending from the floor in a direction opposite the body; and
   a ring extending from the floor within the main body, wherein the ring has a narrower section and a wider section, each with a threaded inner diameter.

2. The adapter defined in claim 1, wherein the at least one side wall is a plurality of side walls.

3. The adapter defined in claim 2, wherein at least one of the plurality of side walls includes a mounting hole.

4. The adapter defined in claim 1, wherein the floor is annular or square.

5. The adapter defined in claim 1, wherein the lip forms a ceiling opposite the floor, and wherein a mounting hole is located in the ceiling.

6. The adapter defined in claim 5, wherein the mounting hole is generally coaxial with the ring.

7. An adapter for mounting a cable hanger on a mounting structure, comprising:
   a floor;
   a pair of side walls extending in a first direction from opposite edges of the floor;
   a ceiling spanning the side walls opposite the floor, the ceiling including a mounting hole;
   a pair of latches extending from the floor in a second direction opposite the side walls; and
   a ring extending from the floor in the first direction, wherein the ring has a narrower section and a wider section, each with a threaded inner diameter.

8. The adapter defined in claim 7, wherein the floor is generally annular or square.

9. The adapter defined in claim 7, wherein the mounting hole is generally coaxial with the ring.

10. The adapter defined in claim 7, wherein the latches are generally arcuate in cross-section, and wherein the ring is generally coaxial with the latches.

11. The adapter defined in claim 10, wherein the mounting hole is generally coaxial with the latches.

12. The adapter defined in claim 5, in combination with a cable hanger mounted in the mounting hole.

13. The adapter defined in claim 7, in combination with a cable hanger mounted in the mounting hole.

* * * * *